United States Patent
Friedrich et al.

(10) Patent No.: US 10,232,730 B2
(45) Date of Patent: Mar. 19, 2019

(54) CONTROL OF A SECONDARY BATTERY WITH BATTERY CELLS WHICH CAN BE CONNECTED IN SERIES WITH ONE ANOTHER

(71) Applicant: Robert Bosch GmbH, Stuttgart (DE)

(72) Inventors: Marco Friedrich, Ludwigsburg (DE); Stefan Butzmann, Schalksmühle (DE)

(73) Assignee: Robert Bosch GmbH, Stuttgart (DE)

( * ) Notice: Subject to any disclaimer, the term of this patent is extended or adjusted under 35 U.S.C. 154(b) by 108 days.

(21) Appl. No.: 15/503,024

(22) PCT Filed: Jul. 29, 2015

(86) PCT No.: PCT/EP2015/067328
§ 371 (c)(1),
(2) Date: Feb. 10, 2017

(87) PCT Pub. No.: WO2016/023749
PCT Pub. Date: Feb. 18, 2016

(65) Prior Publication Data
US 2017/0232863 A1    Aug. 17, 2017

(30) Foreign Application Priority Data
Aug. 11, 2014   (DE) .......................... 10 2014 215 849

(51) Int. Cl.
*B60L 11/18*    (2006.01)
*H01M 10/48*    (2006.01)
(Continued)

(52) U.S. Cl.
CPC ....... *B60L 11/1866* (2013.01); *B60L 11/1853* (2013.01); *B60L 11/1855* (2013.01);
(Continued)

(58) Field of Classification Search
CPC ....... H01M 10/482; H01M 2010/4271; H01M 10/425; H01M 2010/4278; H01M 10/625;
(Continued)

(56) References Cited

U.S. PATENT DOCUMENTS

| | | | |
|---|---|---|---|
| 3,867,643 A | | 2/1975 | Baker et al. |
| 4,238,721 A | * | 12/1980 | DeLuca ................ H02J 7/0016 320/122 |

(Continued)

FOREIGN PATENT DOCUMENTS

| | | |
|---|---|---|
| DE | 2500275 | 7/1975 |
| DE | 69430855 | 12/2002 |

(Continued)

OTHER PUBLICATIONS

International Search Report for Application No. PCT/EP2015/067328 dated Oct. 22, 2015 (English Translation, 3 pages).

(Continued)

*Primary Examiner* — Helen Rossoshek
(74) *Attorney, Agent, or Firm* — Michael Best & Friedrich LLP

(57) ABSTRACT

The invention relates to an open-loop and/or closed loop control system (1) for a secondary battery (3). Each cell electronics unit (4) is configured to detect a respective state of the battery cell (2), to generate a state parameter assigned to the respectively detected state, to weight, with the respective state parameter, a value of a probability of the battery cell (2) being switched on and to control the state of the battery cell (2) as a function of the respective control signal and the value, weighted with the respective state parameter, of the probability of the battery cell (2) being switched on. A control signal contains at least one information item according to which the values, stored in the cell electronics units (4), of the probability of the respective battery cell (2)

(Continued)

being switched on are retained, incrementally increased, incrementally reduced or reset to a predefined output value.

6 Claims, 1 Drawing Sheet

(51) Int. Cl.
*H02J 7/00* (2006.01)
*H01M 10/42* (2006.01)

(52) U.S. Cl.
CPC ....... B60L 11/1859 (2013.01); B60L 11/1861 (2013.01); H01M 10/482 (2013.01); *H01M 2010/4271* (2013.01); *H01M 2010/4278* (2013.01); *H01M 2220/20* (2013.01); *H02J 7/007* (2013.01); *H02J 7/0016* (2013.01); *H02J 2007/0067* (2013.01); *Y02T 10/7005* (2013.01); *Y02T 10/7044* (2013.01); *Y02T 10/7061* (2013.01); *Y02T 90/16* (2013.01)

(58) Field of Classification Search
CPC ......... H01M 10/4257; H01M 10/4207; H01M 10/63; H01M 2220/20; H02J 7/0016; H02J 7/007; H02J 2007/0067; B60L 11/1861; B60L 11/1851; B60L 11/1855; B60L 11/1857; B60L 11/1859; B60L 11/1868; B60L 11/1866; B60L 11/1853; Y02T 10/7055; Y02T 10/7005; Y02T 90/16; Y02T 10/7044; Y02T 10/7061

See application file for complete search history.

(56) References Cited

U.S. PATENT DOCUMENTS

| | | | |
|---|---|---|---|
| 5,744,936 A | 4/1998 | Kawakami | |
| 8,008,891 B2* | 8/2011 | Yun | B60L 11/1861 320/132 |
| 8,212,571 B2* | 7/2012 | Emori | B60L 11/1855 320/118 |
| 8,269,462 B2* | 9/2012 | Yamamoto | B60L 11/1864 307/66 |
| 8,334,673 B2* | 12/2012 | Ishikawa | G01R 31/3658 320/116 |
| 8,723,527 B2* | 5/2014 | Kudo | B60L 3/0046 324/433 |
| 8,802,275 B2* | 8/2014 | Kim | H01M 2/206 429/158 |
| 8,895,177 B2* | 11/2014 | Marchio | H01M 2/1252 429/120 |
| 8,896,273 B2* | 11/2014 | Miyazaki | H02J 7/0026 320/116 |
| 9,729,198 B2* | 8/2017 | Henrici | H04Q 9/00 |
| 9,793,722 B2* | 10/2017 | Tamura | B60R 16/033 |
| 2005/0110460 A1* | 5/2005 | Arai | B60L 3/0046 320/116 |
| 2012/0141848 A1* | 6/2012 | Nagaoka | B60L 11/1855 429/92 |
| 2013/0193926 A1* | 8/2013 | Kluthe | H02J 7/0016 320/122 |
| 2014/0035361 A1* | 2/2014 | Schmidt | B60L 11/1803 307/10.1 |
| 2014/0062385 A1* | 3/2014 | Gaebler | B60L 11/1838 320/106 |
| 2014/0152261 A1* | 6/2014 | Yamauchi | B60L 11/1866 320/118 |
| 2014/0210380 A1 | 7/2014 | Butzmann | |
| 2015/0010790 A1* | 1/2015 | Henrici | H01M 10/425 429/50 |
| 2015/0017498 A1* | 1/2015 | Henrici | H01M 10/425 429/90 |
| 2015/0042263 A1* | 2/2015 | Schmidt | H02J 7/0019 320/104 |
| 2015/0056479 A1* | 2/2015 | Poehler | H01M 2/206 429/50 |
| 2015/0364935 A1* | 12/2015 | Fetzer | H01M 10/425 318/139 |
| 2016/0190828 A1* | 6/2016 | Nakamura | H02J 7/0016 320/118 |
| 2016/0336770 A1* | 11/2016 | Benz | H01M 10/425 |

FOREIGN PATENT DOCUMENTS

| | | |
|---|---|---|
| DE | 102011002548 | 7/2012 |
| DE | 102012211953 | 1/2014 |

OTHER PUBLICATIONS

Aström, K. et al., "PID Control" In: "PID Controllers: Theory, Design, and Turning," Jan. 1, 1995, Instrument Society of America, Research Triangle Park, North Carolina, XP055216477, pp. 59-119.

* cited by examiner

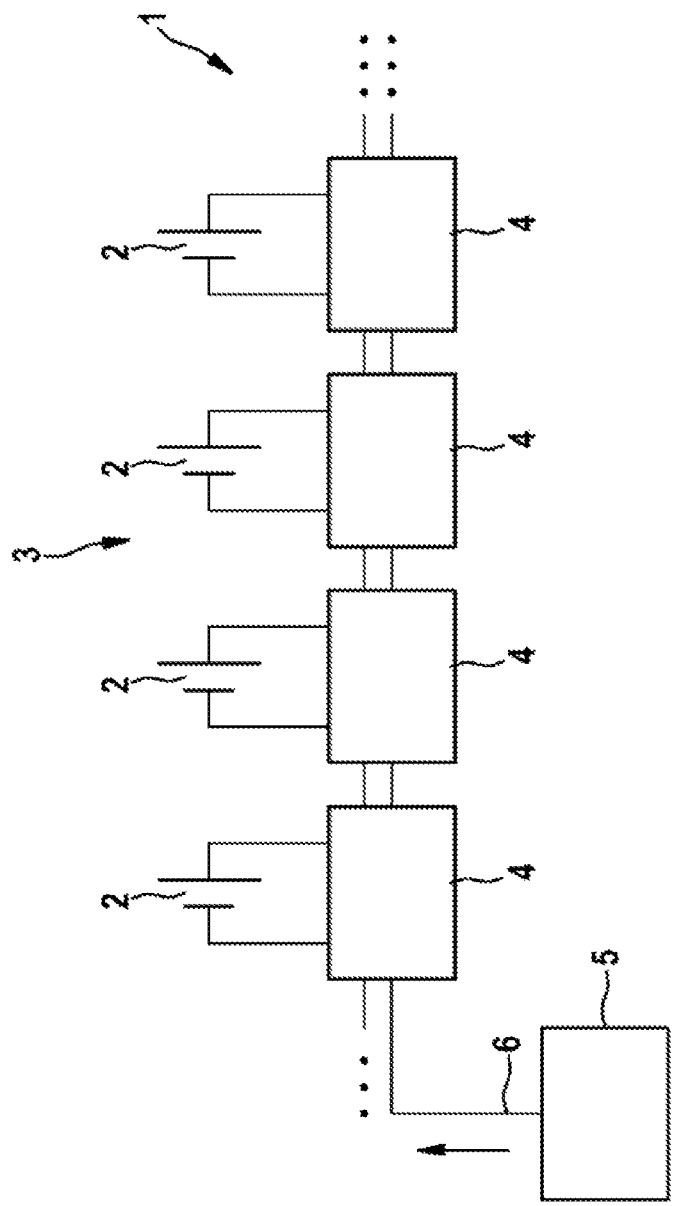

CONTROL OF A SECONDARY BATTERY WITH BATTERY CELLS WHICH CAN BE CONNECTED IN SERIES WITH ONE ANOTHER

BACKGROUND OF THE INVENTION

Secondary batteries are employed in electrically powered vehicles, in particular electric vehicles and hybrid electric vehicles, in order to be used to supply electrical power to electrical drive systems of the motor vehicle.

Conventional battery systems for electro-mobility applications comprise a hard-wired interconnection of battery cells without cell electronics.

In new types of battery systems, while a motor vehicle of this type is running, the output voltage of the secondary battery is varied according to the load currently applied to the secondary battery. For this purpose, a secondary battery comprises a multiplicity of battery cells connected together electrically in series, with the output voltage currently produced by the secondary battery defined by the current number of battery cells connected together electrically in series and by their states of charge. Battery cells that are not needed for generating a desired output voltage are shunted.

The output voltage of a secondary battery is controlled by enabling or disabling, i.e. shunting, individual battery cells in set time intervals using cell electronic units assigned to the individual battery cells. In each of these time intervals, a number of battery cells are enabled, i.e. activated, which number is the number currently needed to produce a required setpoint output voltage.

Enabled, or activated, battery cells can be introduced into a series circuit of battery cells by means of their cell electronic unit with a positive polarity, i.e. in a positive orientation, or with a negative polarity, i.e. in a negative orientation, with respect to the output voltage taken from a secondary battery. Disabled battery cells are electrically isolated from the series circuit, which is usually achieved by electrically connecting together connecting terminals of the cell electronic units assigned to each of the disabled battery cells, thereby shunting these battery cells.

It is known for the purpose of controlling the output voltage of a secondary battery to activate battery cells according to the corresponding state of charge and other state parameters of the battery cells. A relevant cell state can be described by a quality factor, which is defined using one or more characteristics such as, for instance, the state of charge (SOC), the state of health (SOH) or similar properties of a battery cell, is determined for each battery cell during operation of a secondary battery, and is taken into account in the open-loop and/or closed-loop control of the output voltage of the secondary battery. For example, battery cells having a good state of charge and health can be activated more frequently than battery cells having a poor state of charge and health.

SUMMARY OF THE INVENTION

The invention relates to an open-loop and/or closed-loop control system for a secondary battery comprising at least two battery cells which can be connected together electrically in series, in particular of an electrically powered vehicle, comprising at least two cell electronic units each assigned to at least one battery cell, at least one central electronic unit, and at least one communications connection, which can be used to provide a communications link between the central electronic unit and the cell electronic units, wherein the central electronic unit is designed to detect and to compare with a definable setpoint output voltage an actual output voltage currently produced by the secondary battery, to generate at least one control signal according to the current result of the comparison between actual output voltage and setpoint output voltage, and to send the currently generated control signal to all the cell electronic units via the communications connection, wherein each cell electronic unit is designed to detect an instantaneous state of its assigned battery cell, to generate a state parameter associated with the currently detected state, to weight by the currently existing state parameter a value stored in the cell electronic unit for a probability of enabling its assigned battery cell, and to control the state of its assigned battery cell according to the currently existing control signal and the current value for the probability of enabling the battery cell, which value is weighted by the state parameter, and wherein the currently existing control signal contains at least one piece of information, which specifies whether, in the next control step, the values stored in the cell electronic units for the probability of enabling the associated battery cell must be retained, incremented, decremented or reset to a definable initial value.

In the open-loop and/or closed-loop control system according to the invention, the data volume to be transmitted from the central electronic unit to the cell electronic units for open-loop and/or closed-loop control of the secondary battery is reduced compared with the conventional situation in which in each control step a standard absolute value for a probability of enabling the battery cells is transmitted from a central electronic unit to the cell electronic units. Such absolute values for a probability of enabling the battery cells may lie in the value range [0,1], for example, and be transmitted by the central electronic unit via a communications connection to the cell electronic units in each control step, and processed individually in each cell electronic unit. An integer format, for example, can be used for this conventional transmission of absolute values, where 256 discrete values can then be represented by 8 bits in the currently used value range. Assuming that practical open-loop and/or closed-loop control of the output voltage produced by the secondary battery is performed using at least 20000 control steps per second, i.e. at time intervals of 50 µs maximum between individual control steps, then a communications rate of 20000×2×8 bits/s=320 kbits/s is needed to transmit corresponding absolute values for a probability of enabling the battery cells, if an absolute value for the probability of enabling the battery cells and another absolute value for the probability of disabling the battery cells is meant to be transmitted. If additional absolute values are mean to be transmitted, for instance for a minimum bottom SOC limit and a maximum top SOC limit, then this would already require a communications rate of 640 kbit/s. An even higher communications rate would be needed when additional data is meant to be transmitted for error detection and error correction mechanisms when used in an environment subject to interference. In contrast, the control signal according to the invention can be transmitted using just 2 bits, which means either, for a given bandwidth of the communications connection, a higher update rate for the open-loop and/or closed-loop control, allowing more accurate control of the output voltage produced by the secondary battery, or, for a given update rate of the open-loop and/or closed-loop control, a lower minimum bandwidth of the communications connection, which is associated with lower technical complexity and hence lower production costs.

The control signal generated by the central electronic unit preferably takes into account a difference between the actual output voltage currently produced by the secondary battery and the definable setpoint output voltage. In particular, when differences occur between the actual output voltage and the definable setpoint output voltage, the number of activated battery cells can be incremented or decremented in order for the actual output voltage to approach incrementally the setpoint output voltage. A size of an incremental change in the actual output voltage can be set by the currently existing value for the probability of enabling the relevant battery cell, wherein for a small value for this probability, a smaller number of battery cells can be included in the switchover process than for a larger value for this probability.

Using the open-loop and/or closed-loop control system according to the invention, it is possible, for example, for a secondary battery to produce a constant DC voltage or a sinusoidal AC voltage.

Each cell electronic unit is designed to control the state of the battery cell assigned thereto according to the currently existing control signal and the value for the probability of enabling the battery cell, which value is weighted by the currently existing state parameter, wherein each cell electronic unit uses the value for the probability of enabling the battery cell, which value is weighted by the currently existing state parameter, as the individual absolute probability value for enabling its assigned battery cell. Thus a cell electronic unit can use a single probability value to control its assigned battery cell, whereas at least two absolute and separate probability values for enabling and disabling the battery cells are conventionally required.

Setting just one probability value rather than separate enable and disable probabilities is possible in particular when only limited variations occur in the actual output voltage of a secondary battery. In this case, for large differences of the actual output voltage from the specified setpoint output voltage, one of the separate probability values would arise with a large amplitude whereas the other value would be zero. For very small differences of the actual output voltage from the specified setpoint output voltage, the enable and disable probabilities have equally small values close to zero, with the result that it is possible to switch between interpreting the probability value as an enable probability and as a disable probability and to update incrementally the absolute value of the probability value about zero.

Furthermore, when a constant DC voltage is being produced as the actual output voltage, a pulse width modulated component of the actual output voltage of small amplitude (for instance cell voltage) can also be produced. The pulse width modulated component can be produced by setting small values for the probability of enabling the battery cells, and by changing rapidly between enabling and disabling operations. Implementing open-loop and/or closed-loop control of a secondary battery in this way allows the actual output voltage to be set very accurately while at the same time having a small voltage range for the pulse width modulated component, which is advantageous in terms of electromagnetic interference emission.

According to an advantageous embodiment, the currently existing control signal contains information which specifies whether battery cells must be enabled or disabled in a positive orientation and/or which specifies whether battery cells must be enabled or disabled in a negative orientation. This embodiment uses an additional bit for controlling the enabling of battery cells in a positive orientation, an additional bit for controlling the disabling of battery cells in a positive orientation and/or an additional bit for controlling the enabling of battery cells in a negative orientation and an additional bit for controlling the disabling of battery cells in a negative orientation. According to values of the additional bits and of a current value of the absolute probability value, which is formed in a cell electronic unit and gives the probability for enabling or disabling the battery cell assigned to the cell electronic unit, it is possible to enable in a positive orientation disabled battery cells, disable battery cells enabled in a positive orientation and/or enable in a negative orientation disabled battery cells or disable battery cells enabled in a negative orientation. A secondary battery controlled in this manner can accordingly produce a positive or negative actual output voltage by battery cells being enabled either in a positive orientation or in a negative orientation.

In addition, the open-loop and/or closed-loop control system according to this embodiment can be used for what is known as active balancing of the battery cells in order to equalize the states of charge of the battery cells with one another. Battery cells can thereby be activated according to their instantaneous cell state by multiplying, i.e. weighting, in each cell electronic unit the current value for the probability of enabling the battery cells by the currently existing state parameter. Battery cells in good condition, for instance having a high SOC and a high state-of-health value, are thereby more likely to be activated and over a longer time period than cells that have a poor state of charge, for instance a lower SOC and lower state-of-health value. Active balancing of this type is hence possible by using the individual battery cells of the secondary battery for different lengths of time according to the instantaneous state of the battery cells. When a constant actual output voltage, for instance a DC voltage, is being produced by the secondary battery, and there is a very small difference between the actual output voltage and the specifiable setpoint output voltage, a switchover of the activated battery cells can be performed by simultaneously enabling the additional bits for controlling the enabling of battery cells in a positive orientation or for controlling the disabling of battery cells in a positive orientation and/or the additional bits for controlling the enabling of battery cells in a negative orientation or for controlling the disabling of battery cells in a negative orientation.

In conventional methods for active balancing of battery cells in a secondary battery by equalizing the charge between the battery cells, complicated additional wiring of the battery cells is usually needed in order to connect the battery cells or cell modules formed therefrom to one another electrically for the purpose of charge equalization. In addition, active balancing of the battery cells customarily requires control of the balancing process by means of a central control unit.

It is also known to achieve active balancing by enabling individual battery cells in an orientation opposite to the main direction of the actual output voltage taken from the secondary battery, this being achieved by individual battery cells inside the series circuit of battery cells being inserted with reverse polarity into the series circuit. In this case, a number of battery cells needed to produce a required setpoint output voltage are connected together in the same orientation as the main direction of the actual output voltage taken from the secondary battery to form a series circuit. A load current $I_L$ then flows through all the battery cells. To achieve active balancing of the battery cells, individual battery cells are additionally introduced into the series circuit in an opposite orientation to the main direction of the actual output voltage taken from the secondary battery. Simultaneously, the number of battery cells in the main orientation must be increased to achieve the required setpoint output voltage. Battery cells of opposite orientation to the main direction of the actual output voltage taken from the secondary battery are then charged by the load current $I_L$. On a defined higher state of charge being reached, the accordingly charged battery cells are removed (shunted) from the series circuit or introduced into the series circuit in the main orientation, and the total number of battery cells adjusted to achieve the required setpoint output voltage. Controlling the control states of the individual battery cells in order to set the required setpoint output voltage and for cell balancing is conventionally performed centrally by a central control unit, which transmits to the cell electronic units via a communications interface suitable instructions for switching the cell electronic units.

According to the mentioned embodiment of the invention, the control state of the battery cells is set individually and locally in each cell electronic unit. A balancing process can be added to controlling the actual output voltage, according to which process, battery cells having a good state of charge and health are enabled more frequently than cells having a poor state of charge and health. By transmitting a short message, for example 6 bits, on the communications connection between the central electronic unit and the cell electronic units, and calculating an individually weighted probability value in each cell electronic unit, it is possible to define the control state of each cell electronic unit and as a result connect together in a series circuit the number of battery cells needed to achieve a setpoint output voltage. The actual output voltage can be corrected by sending at least one control signal via the communications connection, as a result of which the probability values present in the cell electronic units are changed and enabling and/or disabling processes are specified. For example, when an actual output voltage is too large, the probability value that currently exists in a cell electronic unit can be interpreted as a disable probability, whereby individual battery cells are disabled. When an actual output voltage is too small, the probability value that currently exists in a cell electronic unit can be interpreted as an enable probability, whereby individual battery cells are enabled. The currently existing probability value can be used here to manage the number of battery cells to be enabled or disabled and hence to manage the rate of change of the actual output voltage.

A control state of a battery cell can be determined in the cell electronic unit assigned to this battery cell on the basis of the state of the battery cell. This allows rapid updating of the actual output voltage of the secondary battery and, simultaneously, low-loss active balancing of battery cells of a secondary battery that can be implemented with low technical complexity.

Fully autonomous open-loop and/or closed-loop control can be achieved by battery cells which have a state of charge below a specifiable minimum bottom threshold for the state of charge being introduced in the opposite orientation into the series circuit of battery cells fully autonomously by the cell electronic units assigned to the respective battery cells, wherein the actual output voltage can be corrected by adjusting the probability value given in the corresponding cell electronic unit and interpreting said value as an enable or disable probability.

Centrally managed open-loop and/or closed-loop control can be achieved in that a probability value present in a cell electronic unit is interpreted simultaneously as an enable probability in the main direction and an enable probability in the opposite direction, whereby as a statistical average, approximately the same number of battery cells are enabled opposite to the main direction (for balancing) and in the main direction (for correcting the actual output voltage) of the actual overall output voltage of the secondary battery. Alternatively, the probability values present in the cell electronic units can be interpreted simultaneously as a disable probability in the main direction and a disable probability opposite to the main direction, whereby as a statistical average, approximately the same number of battery cells are disabled opposite to the main direction and in the main direction. This achieves faster adjustment of the actual output voltage compared with the fully autonomous open-loop and/or closed-loop control while at the same time allowing central management of the balancing process by the central electronic unit.

The invention also relates to a method for open-loop and/or closed-loop control of a secondary battery, in particular of an electrically powered vehicle, which battery system comprises a secondary battery comprising at least two battery cells which can be connected together electrically in series, at least two cell electronic units each assigned to at least one battery cell, at least one central electronic unit and at least one communications connection, which can be used to provide a communications link between the central electronic unit and the cell electronic units, wherein the central electronic unit is used to detect and to compare with a definable setpoint output voltage an actual output voltage currently produced by the secondary battery, to generate at least one control signal according to the current result of the comparison between actual output voltage and setpoint output voltage, and to send the currently generated control signal to all the cell electronic units via the communications connection, wherein each cell electronic unit is used to detect an instantaneous state of its assigned battery cell, to generate a state parameter associated with the currently detected state, to weight by the currently existing state parameter a value stored in the cell electronic unit for a probability of enabling its assigned battery cell, and to control the state of its assigned battery cell according to the currently existing control signal and the current value for the probability of enabling the battery cell, which value is weighted by the state parameter, and wherein information, which specifies whether, in the next control step, the values stored in the cell electronic units for the probability of enabling the relevant battery cell must be retained, incremented, decremented or reset to a definable initial value, is used as the currently existing control signal.

The advantages mentioned above with reference to the open-loop and/or closed-loop control system are correspondingly associated with this method.

According to an advantageous embodiment, the currently existing control signal contains at least one piece of information which specifies whether battery cells must be enabled or disabled in a positive orientation and/or which specifies whether battery cells must be enabled or disabled in a negative orientation.

BRIEF DESCRIPTION OF THE DRAWINGS

The invention is explained by way of example below using a preferred exemplary embodiment with reference to the enclosed drawing, where the features presented below may constitute, both each individually and in various combinations with one another, an aspect of the invention, in which drawing:

FIG. 1 is a schematic diagram of an exemplary embodiment of an open-loop and/or closed-loop control system according to the invention.

DETAILED DESCRIPTION

FIG. 1 shows a schematic diagram of an exemplary embodiment of an open-loop and/or closed-loop control system 1 according to the invention for a secondary battery 3 of an electrically powered vehicle, which secondary battery comprises a plurality of battery cells 2 which can be connected together electrically in series. The open-loop and/or closed-loop control system 1 comprises a plurality of cell electronic units 4 each assigned to a battery cell 2, a central electronic unit 5 and a communications connection 6, which can be used to provide a communications link between the central electronic unit 5 and the cell electronic units 4.

The central electronic unit 5 is designed to detect and to compare with a definable setpoint output voltage an actual output voltage currently produced by the secondary battery 3, to generate at least one control signal according to the current result of the comparison between actual output voltage and setpoint output voltage, and to send the currently generated control signal to all the cell electronic units 4 via the communications connection 6.

Each cell electronic unit 4 is designed to detect a currently existing state of its assigned battery cell 2, to generate a state parameter associated with the currently detected state, to weight by the currently existing state parameter a value stored in the cell electronic unit 4 for a probability of enabling its assigned battery cell 2, and to control the state of its assigned battery cell 2 according to the currently existing control signal and the value for the probability of enabling the battery cell 2, which value is weighted by the currently existing state parameter.

The currently existing control signal contains at least one piece of information, which specifies whether, in the next control step, the values stored in the cell electronic units 4 for the probability of enabling the relevant battery cell 2 must be retained, incremented, decremented or reset to a definable initial value. In addition, the currently existing control signal can contain information which specifies whether battery cells 2 must be enabled or disabled in a positive orientation and/or which specifies whether battery cells 2 must be enabled or disabled in a negative orientation.

The invention claimed is:

1. An open-loop and/or closed-loop control system (1) for a secondary battery (3) comprising at least two battery cells (2) connected together electrically in series, comprising
at least two cell electronic units (4) each assigned to at least one battery cell (2),
at least one central electronic unit (5), and
at least one communications connection (6), providing a communications link between the central electronic unit (5) and the cell electronic units (4),
wherein the central electronic unit (5) is configured to detect and to compare, with a specifiable setpoint output voltage, an actual output voltage currently produced by the secondary battery (3), to generate at least one control signal based on the current result of the comparison between actual output voltage and setpoint output voltage, and to send the currently generated control signal to all the cell electronic units (4) via the communications connection (6),
wherein each cell electronic unit (4) is configured to detect a currently existing state of its assigned battery cell (2), to generate a state parameter associated with the currently detected state, to weight, by the currently existing state parameter, a value stored in the cell electronic unit (4) for a probability of enabling its assigned battery cell (2), and to control the state of its assigned battery cell (2) according to the currently existing control signal and the value for the probability of enabling the battery cell (2), which value is weighted by the currently existing state parameter, and
wherein the currently existing control signal contains at least one piece of information which specifies whether, in the next control step, the values stored in the cell electronic units (4) for the probability of enabling the associated battery cell (2) are retained, incremented, decremented or reset to a definable initial value.

2. The open-loop and/or closed-loop control system (1) as claimed in claim 1, characterized in that the currently existing control signal contains information which specifies whether battery cells (2) are to be enabled or disabled in a positive orientation and/or which specifies whether battery cells (2) are to be enabled or disabled in a negative orientation.

3. The method as claimed in claim 1, wherein the secondary battery (3) is a battery of an electrically powered vehicle.

4. A method for open-loop and/or closed-loop control of a secondary battery, which battery system comprises a secondary battery (3) comprising at least two battery cells (2) connected together electrically in series, at least two cell electronic units (4) each assigned to at least one battery cell (2), at least one central electronic unit (5) and at least one communications connection (6), which can be used to provide a communications link between the central electronic unit (5) and the cell electronic units (4),
wherein the central electronic unit (5) detects and compares, with a specifiable setpoint output voltage, an actual output voltage currently produced by the secondary battery (3), to generate at least one control signal based on the current result of the comparison between actual output voltage and setpoint output voltage, and to send the currently generated control signal to all the cell electronic units (4) via the communications connection (6),
wherein each cell electronic unit (4) detects an instantaneous state of its assigned battery cell (2), generates a state parameter associated with the currently detected state, weights, by the currently existing state parameter, a value stored in the cell electronic unit (4) for a probability of enabling its assigned battery cell (2), and controls the state of its assigned battery cell (2) based on the currently existing control signal and the current value for the probability of enabling the battery cell (2), which value is weighted by the state parameter, and
wherein at least one piece of information, which specifies whether, in the next control step, the values stored in the cell electronic units (4) for the probability of enabling the relevant battery cell (2) are retained, incremented, decremented or reset to a definable initial value, is used as the currently existing control signal.

5. The method as claimed in claim 4, characterized in that the currently existing control signal contains information which specifies whether battery cells (2) are to be enabled or disabled in a positive orientation and/or which specifies whether battery cells (2) are to be enabled or disabled in a negative orientation.

6. The method as claimed in claim 4, wherein the secondary battery is a battery of an electrically powered vehicle.

* * * * *